United States Patent [19]

Kunert

[11] Patent Number: 4,571,278
[45] Date of Patent: Feb. 18, 1986

[54] GLUE MOUNTING OF A GLASS IN A BAY
[75] Inventor: Heinz Kunert, Cologne, Fed. Rep. of Germany
[73] Assignee: Saint-Gobain Vitrage, Courbevoie, France
[21] Appl. No.: 592,893
[22] Filed: Mar. 23, 1984
[30] Foreign Application Priority Data Mar. 31, 1983 [FR] France .................................. 83 05328

[51] Int. Cl.$^4$ .............................................. B60J 1/00
[52] U.S. Cl. .................................... 156/108; 52/208; 52/400; 52/746; 156/244.25; 156/293; 156/308.6; 156/310; 156/315; 264/259; 296/84 R; 296/146
[58] Field of Search ............... 156/108, 310, 293, 315, 156/308.6, 244.25; 264/259; 52/208, 746, 400; 296/84 R, 146

[56] References Cited

U.S. PATENT DOCUMENTS

| | | | |
|---|---|---|---|
| 3,155,204 | 11/1964 | Campbell et al. | 156/108 |
| 3,416,833 | 12/1968 | Griffin | 52/208 |
| 3,574,024 | 4/1971 | Rose | 156/108 |
| 3,895,859 | 7/1975 | Yoshida et al. | 296/146 |
| 3,981,113 | 9/1976 | Griffin | 52/208 |
| 4,441,755 | 4/1984 | Endo et al. | 296/84 R |

Primary Examiner—John J. Gallagher
Attorney, Agent, or Firm—Oblon, Fisher, Spivak, McClelland & Maier

[57] ABSTRACT

A process for mounting a piece of glass in a bay, particularly the windshield of a motor vehicle, is disclosed which comprises forming a first bead of hardenable adhesive material on the edge of the glass to be inserted in the bay, and thereafter superpositioning said bead on a second bead of adhesive material compatible with said first bead and pressing the glass piece into the bay, while the second bead hardens. The second bead may be formed either on the first bead of adhesive material, or in the bay itself, immediately prior to insertion of the glass piece.

Preferably, the first formed bead has a section exhibiting a tongue or protrusion extending away from the periphery of the glass towards the bay, which serves to contain the lateral expansion of the second bead of adhesive material upon pressing, and hides the second bead of material from view upon insertion.

13 Claims, 5 Drawing Figures

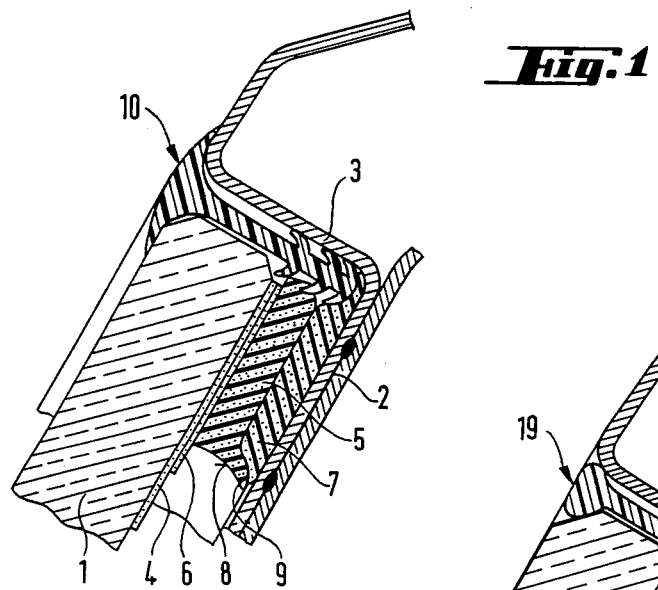
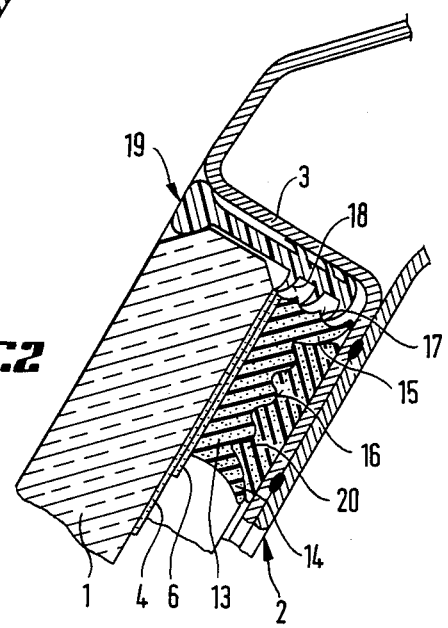
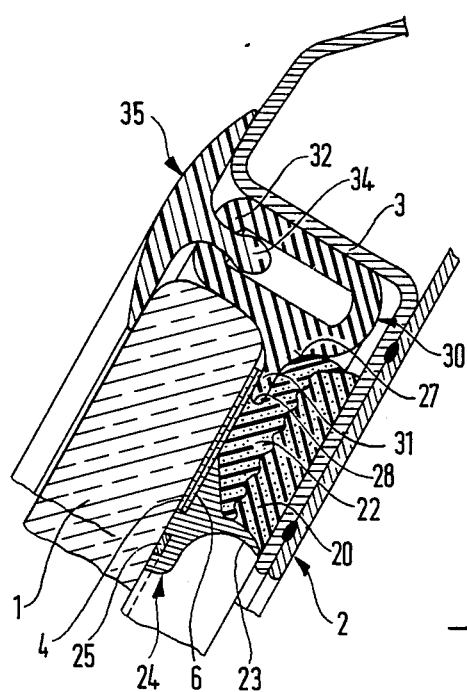

GLUE MOUNTING OF A GLASS IN A BAY

BACKGROUND OF THE INVENTION

1. Field of the Invention

This invention is directed to a process for mounting a glass in a bay by gluing, by means of an adhesive bead composed of two portions adhering to one another. In the following description, reference will be made essentially to glass intended for motor vehicles; nevertheless, the invention can also be applied elsewhere as the problem arises of mounting a glass in a bay, by gluing, under satisfactory conditions of adherence and fluid tightness in many different situations. Applications in building, for example, can be envisaged.

2. Background of the Prior Art

Various processes for glue mounting of glass in a bay are already known. It has, for example, been suggested to use adhesive strips made up of materials suited to adhere to one another, one of which is applied on the glass and the other on the frame of the bay. The publication of patent DE AS No. 17 55 724 describes this process in which an adhesive strip placed on the edge of the glass exhibits a narrow unevenness which sinks into a softer material which constitutes a strip placed on the fold of the body. However, attachment of the glass of vehicles by means of prefabricated adhesive strips frequently fails to meet the requirements for adherence and fluid tightness necessary.

SUMMARY OF THE INVENTION

The invention proposes providing a process for glue mounting of a glass in a bay, particularly a body bay of motor vehicles, which eliminates these drawbacks by making it possible, in particular, to obtain an increased adherence of the adhesive to the glass and a better fluid tightness of the glass-body joint. The process also secures a significant time advantage on the assembly line in the automobile factory.

The process according to the invention comprises forming two bead portions by depositing onto the glass materials able to harden in the air in two stages: the first portion is deposited and hardened shortly after the glass is formed, while the second portion is deposited shortly before the mounting of the glass.

The second portion can be deposited on the bay or on the first portion which has already hardened. Preferably, the second portion is deposited on the first.

BRIEF DESCRIPTION OF THE DRAWINGS

FIG. 1 illustrates a view in section of a glass piece provided with an L-shaped section bead deposited on the glass.

FIG. 2 illustrates a glass piece with a bead deposited on the glass having a U-shaped section.

FIG. 3 illustrates the use of an additional molding placed beside the bead to be glued to the glass.

DETAILED DESCRIPTION OF THE INVENTION

Figure 4:
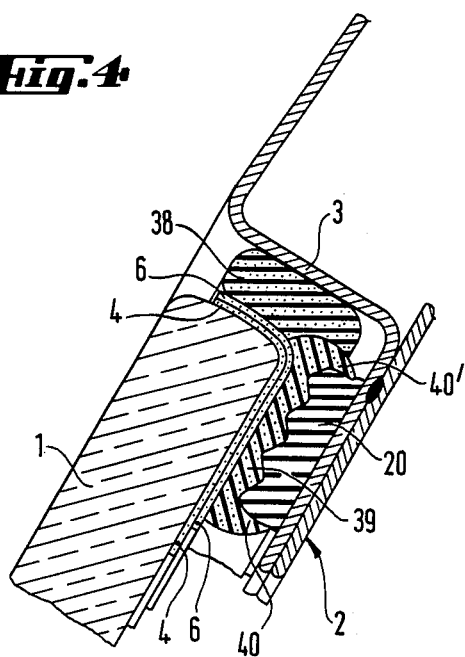
In FIG. 4, an additional shape is illustrated placed on the periphery of the glass.

In a preferred embodiment of the invention, the following process limitations are observed:

(a) the bead portion which adheres to the glass has an extension, comprising at least a tongue extending away from the glass in the direction of the fold in the bay which is to receive the glass at a certain distance from the edge of the glass.

(b) The first bead portion is formed essentially of an adhesive material hardened at the time the glass is mounted.

(c) The adhesive material is deposited on the glass by means of an extrusion die gauged to give the L-shape section.

(d) If necessary, an opaque coating for protection against the UV rays is previously applied along the periphery of the glass prior to application of the first bead portion.

(e) The second bead portion is made by applying the adhesive material by extrusion on the first which has previously hardened; it is hidden from view thanks to the tongue of the first portion.

In comparison with mounting processes already known, the process according to the invention exhibits a great number of advantages. For example, the first bead portion can be applied on the glass at the same place the glass is manufactured. Thus, an additional cleaning of the surface of the glass or of the opaque layer optionally deposited on the edges of the glass can possibly be avoided, since that proves necessary when the bead is deposited only on the production of the vehicle. Actually, it is immediately after its baking that an opaque layer of enamel, for example, exhibits the most favorable conditions for a good adherence of the adhesive material.

The bead formed at the same place the glass is manufactured is also used as a spacer during the handling and the packing of the glass and thus reduces the risks of damage.

A glass that is suitable for using the process comprises, along its periphery, an opaque layer, particularly of black enamel, a bottom layer and a bead attached by adherence which has a gauged section exhibiting a tongue arranged away from the interior of the glass so as to define an L section. Advantageously, the bead exhibits an additional tongue, arranged toward the exterior of the glass, so that the two tongues define a U section.

In this process, in which a first bead portion is extruded immediately before it is deposited on the edges of the glass, there can be attached simultaneously on the surface of the glass additional elements, such as for example decorative moldings, spacers or other coverings, either by coextrusion, or independently.

According to a preferred embodiment of the invention, the bead glued on the edges of the glass has a U-shaped guaged section, and the second portion is deposited between the two branches of the U.

This embodiment exhibits additional advantages: the two tongues made up of the two branches of the U are used as a stop for the adhesive material of the bead deposited later and thus channel this material by preventing it from flowing over laterally.

While the adhesive bead deposited on the glass has already hardened at the time of the mounting in the bay, only a short time before said mounting, the second portion is extruded over the first in the space delimited by the tongue or tongues of the first or over the fold of the bay receiving the glass. When the glass is pressed against the fold of the bay provided to receive it, the second portion of bead, freshly extruded, fills the channel defined by the first, while the two tongues, for example the two branches of a U, prevent the lateral overflow of the final extruded adhesive material.

In comparison with existing processes, the process according to the invention, achieves a particularly advantageous gain of time. It is always necessary, for glue mounting of a glass in a bay, to use a certain thickness of adhesive, to assure a good bond and a good fluid tightness which could particularly be impaired by the tolerances of the shape of the glass and/or of the bay. By depositing, as soon as the glass is manufactured, a certain thichness of adhesive bead, the amount of adhesive to be deposited at the time of mounting is proportionally reduced. The drying time is accordingly lowered and the mounting more quickly completed.

Preferably, as a material forming the bead to be extruded, a polyurethane prepolymer is used with a compound in pasty form which, after extrusion, hardens under the effect of the moisture in the air. A polyurethane system with two compounds or a butyl rubber system or a silicone elastomer can also be used. It is important to use, for both beads, materials that are compatible with each other which also produce a good internal bond. For this purpose, it is advisable that the two beads have an identical or very close composition. In numerous cases, the surface of the glass where the bead must be deposited is advantageously covered with a bottom layer, or adherence primer, depending on the composition of the adhesive used.

If necessary, the surface of the bead already hardened can be reactivated by suitable mechanical or chemical means.

Other characteristics and advantages of the invention will appear in the following description of various embodiments of the invention, in the form of a glass mounted in a bay, with reference to the figures.

For simplicity, glass 1 is represented as a solid piece. Of course, however, all types of glass can be mounted in a bay in the indicated manner since the mounting according to the invention is independent of the structure of the glass.

Glass piece 1 is provided, along its periphery and the side directed toward fold 2 of the bay, with an opaque layer 4, for example, a layer of black enamel. This layer serves, on the one hand as a decorative molding and prevents the adhesive zone from being seen from the outside through glass 1 and, on the other hand, it protects adhesive bead 5 from UV rays, and can possibly facilitate the adherence of the bead to the surface of the glass. A wide variety of such substances are currently available, and the particular one employed is preferably selected for its ease of deposition on glass. According to a reliable process, a baking compound is printed, for example by silkscreen printing, on the surface of the glass and it is baked on this surface during a heat treatment necessary for the bending and/or the tempering of the glass.

There is deposited on opaque layer 4, after it is baked, a fine and regular bottom layer or adherence primer 6 that adheres suitably to layer 4. This layer 6 can, for example, consist of a polyurethane prepolymer dissolved in a solvent such as the product PRIMER 8544 of the German company TEROSON-WERKE GmbH, or the product GLASPRIMER V 538/6573 of the German company TOGO. The layer is deposited by means of a fine slotted extrusion nozzle, the nozzle being fed regularly by a hose for bringing the product from a supply tank. This depositing can be done by hand, or preferably, by an automatic arm, along the contour of the glass. Optionally, the layer of black enamel is previously treated with special silane-type products.

If the bottom layer is formed from a polyurethane system that hardens under the effect of moisture, the necessary hardening time can be reduced by applying steam by an additional nozzle. In comparison with the normal conditions of temperature and moisture of the air, the necessary time goes from about 5 to 10 minutes to about 1 to 2 minutes. In this way, the adhesive bead can be applied in a shorter period after the depositing of the bottom layer.

The portion of adhesive bead 5 in FIG. 1 is formed preferably with a polyurethane prepolymer; it is deposited on bottom layer 6 where it hardens into a high modulus polymer. It is formed so that it has a section practically at a right angle in an L-shape, and exhibits a tongue 8 which progessively narrows toward fold 2 of the sheet of the bay and away from the interior of the glass piece. A system which combines the bottom layer and the adhesive as described in U.S. Pat. No. 3,779,794 gives good results.

While all the stages previously described are carried out at the glass factory, there is deposited, on the first portion which has hardened, a second bead portion 7 formed from a material compatible with it, just before the positioning of the glass in the body bay and in the same way by a suitable extruder.

The bead portion which has hardened can be used as a means for support and for guiding the extrusion nozzle of the second protion, and thus facilitates the depositing of the second portion.

As soon as bead portion 7 has been deposited on bead portion 5, glass 1 is positioned in the bay and is pressed thereinto. Then, there is inserted in the gap which exists between glass 1 and sheet portion 3, a shape 10 provided with hook-shaped linings, which is caught in adhesive bead 7.

When it is necessary, the mutual adherence of the two bead portions 5 and 7 can be reinforced by depositing a suitable solvent or inflating agent on the surface of bead portion 5 before it is put in contact with bead portion 7, to reactivate it. This chemical reactivation can be replaced by a mechanical reactivation consisting of an abrasion of the surface of bead 5.

The embodiment illustrated in FIG. 2 employs the same type of mounting as that described in FIG. 1. However, in this case, a bead portion 13 is formed from a prepolymer of extrudable polyurethane, by means of an extrusion nozzle whose section is U-shaped, so that this portion deposited on bottom layer 6, over enamel layer 4, exhibits two tongues 14, 15 which delimit an empty space. To increase the free surface of the bead, the portion of surface between the two tongues, and that near part 3 of the frame of the bay are lined with grooves 16 and 17. The hook-shaped linings 18 of a shape 19 are locked on grooves 17.

The empty space delimited by tongues 14, 15 and grooved surface 16 is filled, by means of an extrusion nozzle, with a second bead portion 20 formed from a pasty adhesive material able to adhere to hardened bead portion 13. When the glass is pressed against fold 2 of the body, tapered tongues 14 and 15 yield and thus compensate for the possible variations of depth of the fold of the bay.

FIG. 3 illustrates another embodiment of the invention, in which bead portion 22 itself and tongue 23 are composed of different materials coextruded using tow extruders delivering into a single extrusion nozzle. In this way a tongue 23 can be formed whose properties are different from that of bead portion 22. For example, it is possible to give it a greater hardness or to manufacture it from a material of another color. It is further necessary that this material have greater adherence to the surface of the glass than the material which forms bead portion 22. In the case represented in the figure, molding 24 which constitutes the base of tongue 23 overlaps both opaque layer 4, lined with bottom layer 6, and the bare surface of the glass. This makes is visible from the outside. In this case, the visible part can then be covered with decorative strips 25.

Bead portion 22 exhibits, on the side directed toward portion 3 of the bay, a tapered surface element 27. Because of the shape of this surface element, a groove 28 is made in which tongue 31 of a seal 30 is inserted. This seal fills the empty space between the edge of glass 1 and sheet portion 3 of the body bay. It further exhibits a U-shaped section which opens on the face of the glass turned outward from the passenger space of the vehicle, the branches of the U being ended by locking protrusions 32 which hold attachment tongue 34 of a covering seal 35.

In the embodiment illustrated in FIG. 4, the empty space between the edge of glass 1 and sheet portion 3 of the bay is also filled with a rubber seal 38. In this case, it is applied on the glass at the same time as bead portion 39, for example by coextrusion. The presence of bottom layer 6 also contributes to improving the adherence between the glass or enamel layer 4 and bead portion 39. The latter exhibits two tongues 40 and 41 which delimit an empty space filled with second bead portion 20 glued on fold 2 of the bay.

Seal 38 acts essentially to hold the glass after its positioning while waiting for the complete hardening of adhesive bead 20.

Figure 5:
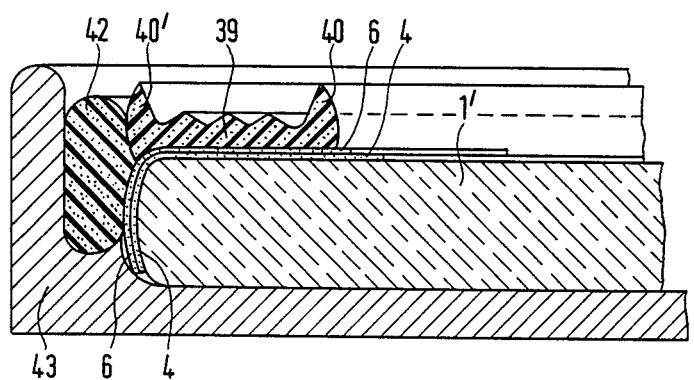
FIG. 5 illustrates a glass piece in cross section with an additional shape provided by injection molding.

FIG. 5 illustrates an embodiment similar to the one described in relation to FIG. 4, but in which seal 42 is gauged as a result of an injection molding process. Bead portion 39 has the U-shaped section described. It can be deposited on the periphery of the glass at the same time as seal 42, after the previous depositing of an enamel layer 4 and a bottom layer 6 and can be formed from the same material as seal 42. But it is also possible for these two shapes to be composed differently, or even deposited on the glass at different moments. This molding process is particularly advantageous because the desired appearance can be given to the exterior contour of the glass simply be applying on the edge of the glass a shape of determined form. In this specific case, a sheet of glass can also be manufactured with slightly reduced dimensions and, by injection in a mold whose dimensions correspond to the ones desired, to obtain the final desired dimensions of the glass.

In all the cases described, it is also possible to form the second portion of adhesive bead by extruding, using suitable means, the adhesive material on fold 2 of the bay. The advantages of the invention are entirely preserved in this embodiment: the tongues of the first bead play their role, and the mounting is facilitated, in comparison with processes of the prior art, by particularly an increased speed of execution on the assembly line. After the depositing of the second adhesive portion, the glass, as in the previously described cases, is positioned in the bay by pressing it thereinto.

What is claimed as new and desired to be secured by Letters Patent of the United States is:

1. A process for mounting a glass piece in a bay by gluing, comprising:
    depositing a first bead of adhesive material on a portion of said glass piece to be inserted in said bay, and allowing said bead to harden;
    superimposing on said hardened first bead a second bead of adhesive material capable of adhering to said first bead; and
    pressing said glass piece into said bay and maintaining said glass piece in said position until said second bead hardens.

2. The process of claim 1, wherein said first bead is formed on said glass piece by extrusion, and said superpositioning is effected by forming said second bead on said first bead.

3. The process of claim 1, wherein said first bead portion is deposited on said glass by extrusion, and said second bead is formed in said bay.

4. The process of claim 1, wherein an opaque coating is deposited on said portion of said glass to be inserted in said bay prior to deposition of said first bead, and said first bead is deposited thereover.

5. The process of claim 1, wherein said first bead is formed such that it bears a protrusion away from said glass piece and in the direction of the bay in which the glass is to be mounted, and said second bead is deposited such that, upon mounting, it is hidden from view by the presence of said protrusion.

6. The process of claim 5, wherein said first bead has an L-shaped cross section.

7. The process of claim 5, wherein said first bead has a U-shaped cross section.

8. The process of claim 5, wherein said protrusion is tapered.

9. The process of claim 1, wherein said first bead, on the side opposite said glass piece, has grooves which increase the surface area thereof.

10. The process of claim 5, wherein said protrusion is formed on a separate piece coextruded with said first bead.

11. The process of claim 10, wherein a decorative strip of material is inserted between said separate piece and said glass piece.

12. The process of claim 11, further comprising the coextrusion of a shaped seal onto said glass piece with the extrusion of said first bead.

13. The process of claim 1, wherein the portion of said first bead superimposed on said second bead is treated before said superpositioning with an inflating agent or solvent which improves the adherence between said first and second beads.

* * * * *